United States Patent [19]

Gogins

[11] 4,302,684
[45] Nov. 24, 1981

[54] FREE WING TURBINE

[76] Inventor: Laird B. Gogins, 211 S. Sundrun Rd., Salt Lake City, Utah 84103

[21] Appl. No.: 54,875

[22] Filed: Jul. 5, 1979

[51] Int. Cl.³ ........................... F03D 5/04; H02P 9/04
[52] U.S. Cl. ...................................... 290/55; 290/44; 416/8; 416/DIG. 4
[58] Field of Search .................................. 290/42–44, 290/53–55; 415/5, 13, 48; 416/7–9, 17, 104, 131, 132 R, 196 A, 226, 232–236, 238–240, 142–143, 197 A

[56] References Cited

U.S. PATENT DOCUMENTS

| 554,138 | 2/1896 | Negbaur | 290/55 |
|---|---|---|---|
| 665,810 | 1/1901 | Stretch | 290/55 |
| 1,181,988 | 5/1916 | Breitung | 290/44 |
| 1,352,859 | 9/1920 | Wilson | 416/17 |
| 3,792,327 | 2/1974 | Waldorf | 290/16 |
| 4,076,190 | 2/1978 | Lois | 416/9 |
| 4,088,352 | 5/1978 | Kling | 416/9 |
| 4,115,027 | 9/1978 | Thomas | 290/55 |
| 4,134,707 | 1/1979 | Ewers | 290/55 |

FOREIGN PATENT DOCUMENTS

| 2257024 | 8/1975 | France | 416/119 |
|---|---|---|---|
| 134712 | 11/1929 | Switzerland | 416/7 |
| 1168314 | 10/1969 | United Kingdom | 290/55 |

Primary Examiner—J. V. Truhe
Assistant Examiner—Shelley Wade
Attorney, Agent, or Firm—Curtis, Morris & Safford

[57] ABSTRACT

Apparatus to convert wind energy into mechanical and electrical energy including a variable pitch air-foil supported by tension guy wires on a wheeled structure constrained to move upon a continuous track. The structure includes electrical generators powered by the rotation of the structure's wheels to convert movement of the structure into electrical energy. The air-foil is supported upright on the wheeled structure, which is designed to resist upward, downward and sideways forces, to capture wind energy at a higher elevation above the ground where winds blow stronger.

11 Claims, 5 Drawing Figures

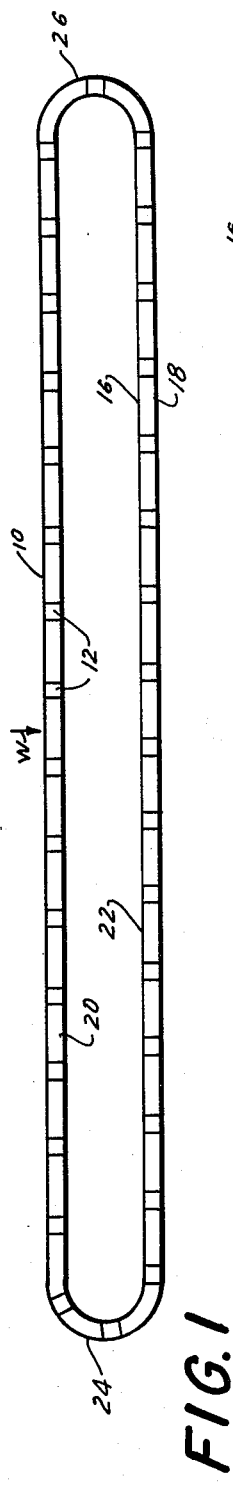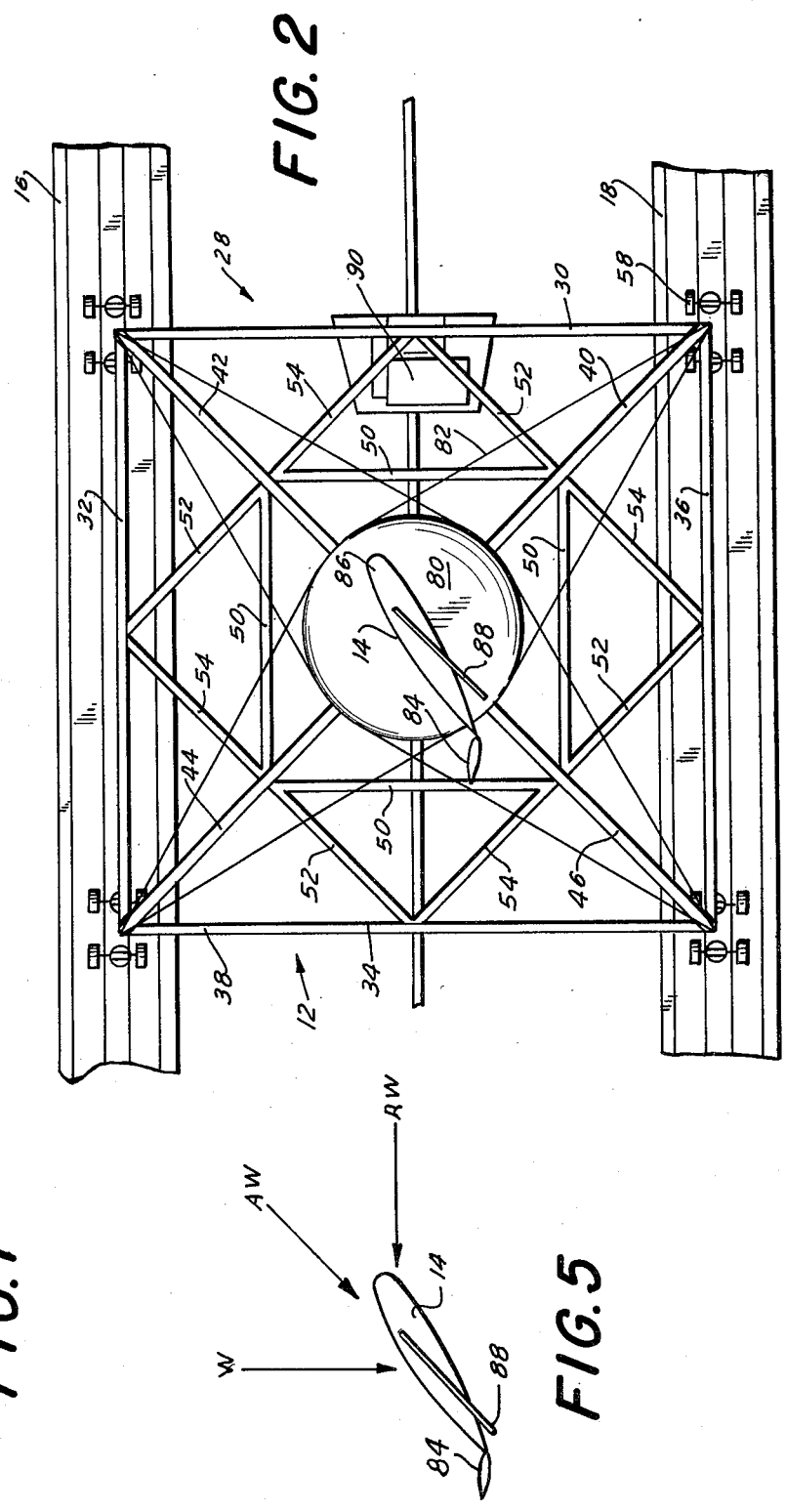

FREE WING TURBINE

BACKGROUND OF THE INVENTION

1. Field of the Invention

This invention relates generally to electrical energy generation, and more particularly to the generation of electrical energy from wind energy.

2. Description of the Prior Art

With the energy crisis facing most industrialized countries of the world brought about by the increasing scarcity and rapidly escalating cost of oil and natural gas, utility companies have realized that alternative sources to oil and natural gas of electrical power generation must be developed and utilized. Such alternative sources, such as nuclear, hydro-electric power generation, solar power generation and wind power generation must be developed and utilized.

However, because of the increasing public outcry as to further reliance on nuclear power generation, that alternative is becoming increasingly a less viable alternate to fossil fuel power generation. Hydro-electric generation is limited to geographical areas with sufficient water resources to operate such facilities and solar power generation technology has not advanced to a state where it would lend itself to generation of sufficient power to supply the present critical needs.

In 1972 the Solar Energy Panel of the National Science Foundation and the National Aeronautics and Space Administration estimated that there are 100,000 gigawatts of recoverable wind energy in the United States alone. This is one hundred times as much electrical power as is estimated to be required in the United States in 1980.

There is a cubic relationship between wind speed and power, that is power is proportional to wind speed cubed. Wind speeds increase logarithmically with height and over a level area the wind at an elevation of 220 feet will blow 1.27 times as fast as at a 50 foot elevation. Because of the cubic relationship between power and wind speed the power available from the wind at the 220 foot elevation would be 2.051 times as great as the power available at the 50 foot elevation.

Thus, it has been proposed to attempt to harness the tremendous energy present in the wind to generate electrical energy. Such prior proposals to harness wind energy have centered around variations of the windmill to capture the wind energy. Recent developments in this area are reflected by the proposed ERDA-NASA wind turbine which mounts a variable pitch propeller of about 125 feet in diameter on a fixed tower 100 feet in height.

As presently designed, the ERDA-NASA wind turbine operates at a constant speed of 40 rpm in wind speeds between 6 and 60 mph with the turbine blades being fully feathered in wind speeds above 60 mph. The rotor, transmission, generator and controls of the ERDA-NASA wind turbine are mounted on a rotatable bedplate at the top of the 100 foot high tower. Torque is transmitted from the rotor hub to the electrical generator through a gear box with a speed ratio of 45 to 1. Rated capacity of this unit is rated at 100 KW in an 18 mph wind. This type of wind turbine sacrifices power output at wind speeds greater than 18 mph because at higher wind speeds the rotor is maintained at 40 rpm by varying the pitch of the rotor blades to maintain the constant rated power output of 100 KW. Power is also sacrificed at wind speeds less than 18 mph by changing generator loadings to maintain the rotor turning at the required 40 rpm.

In addition, wind tunnel tests suggest that the minimum permissible spacing required between adjacent ERDA-NASA type wind turbines to prevent interaction of the rotors is ten times the rotor diameter. With a rotor diameter of 125 feet the minimum spacing between adjacent units would be 1,250 feet. At that spacing, at an average power output of 100 KW each, to produce 100 magawatts of rated power capacity would require an area of about 90 square miles.

Thus, it is evident that for large power requirements the ERDA-NASA type wind turbine is not a viable solution because of the large land mass needed to sustain a wind turbine farm. In addition, capital costs of construction are high.

OBJECTS AND SUMMARY OF THE INVENTION

It is an object of the present invention to provide an apparatus to effectively harness wind energy to generate electrical energy.

It is a further object of the present invention to provide such an apparatus with a minimum of capital cost and which requires less land area per electrical energy generated than other wind power electrical generating systems heretofore proposed.

It is yet another object of the present invention to provide a system to generate electrical energy from wind power which is more efficient than heretofore proposed wind power electrical generating systems.

In accordance with one aspect of the present invention a symmetrical airfoil which may be three hundred feet or more in length is supported upright by guy wires on a wheeled support structure adapted to roll about an oval track layout. The airfoil is free to rotate about its longitudinal axis so that it can be positioned for maximum effectiveness to the optimum angle of attack with respect to wind direction.

The wheeled support structure includes electrical generators coupled to the wheels to generate electrical energy through the rotation of the wheels as the wind, acting against the airfoil, powers the structure around the track. In a preferred embodiment diesels are carried by each wheeled structure to power the generators during relatively infrequent periods when the ambient wind speed is insufficient to move the structures around the track.

Alternatively, other systems can be employed to store excess energy generated during periods when the wind speed generates more energy than is needed for subsequent use during periods when the wind speed is too low to generate sufficient electrical energy. Such supplemental energy storage systems may be electrochemical storage systems, e.g. batteries or systems that store hydrogen generated by electrolysis, thermal energy storage systems, kinetic energy storage systems, e.g. flywheels or super-conducting electromagnetic systems or potential energy systems, e.g. pumped water or compressed air systems.

BRIEF DESCRIPTION OF THE DRAWINGS

FIG. 1 is a schematic plan view of a typical track layout for the free wing turbine of the present invention showing a number of air-foils on rolling supporting structures;

FIG. 2 is a top plan view of a typical air-foil of the present invention mounted on a wheeled support structure;

FIG. 5 is a diagrammatic representation of the airfoil of the present invention showing the wind force vectors acting on it.

DETAILED DESCRIPTION OF A PREFERRED EMBODIMENT

Figure 3:
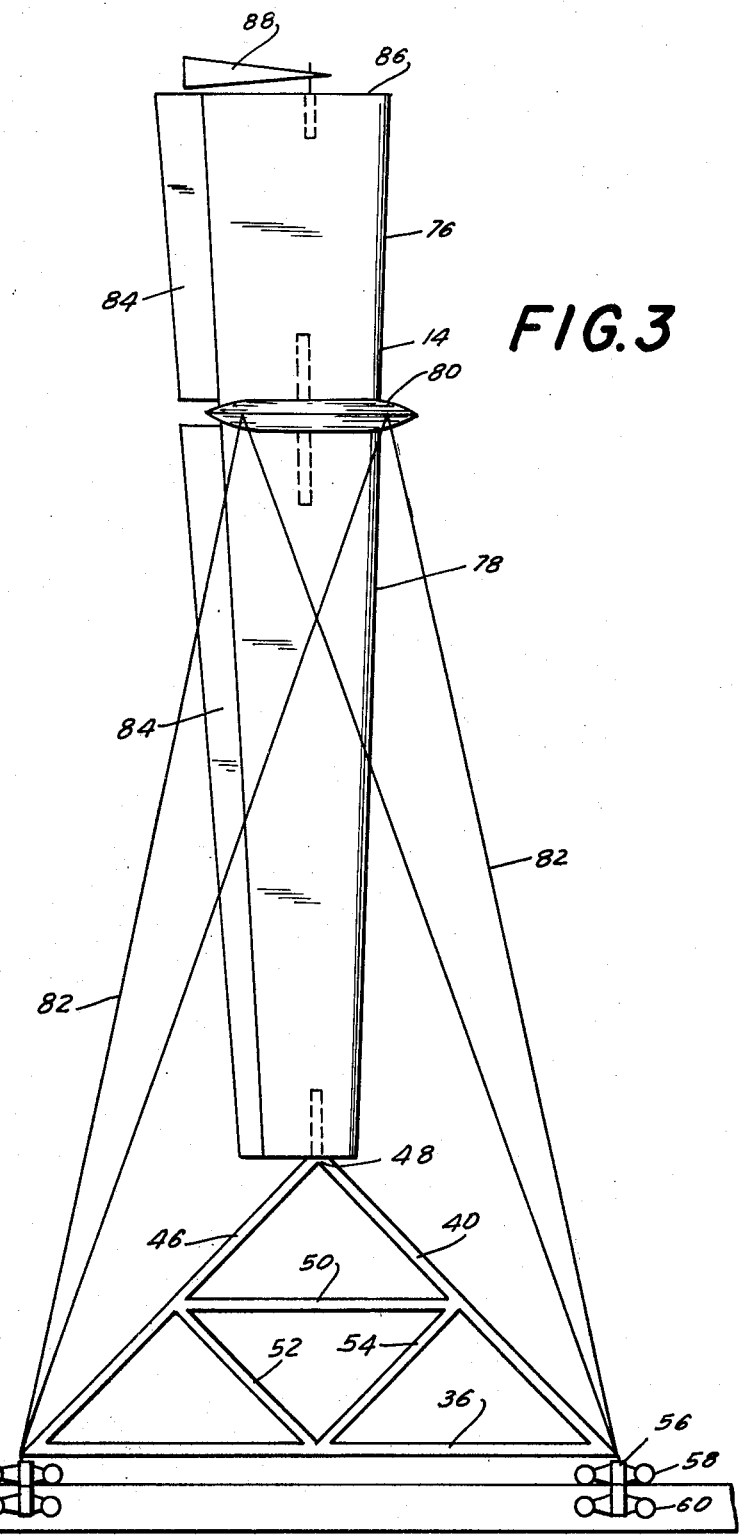
FIG. 3 is a side elevational view of the structure of FIG. 2.
Figure 4:
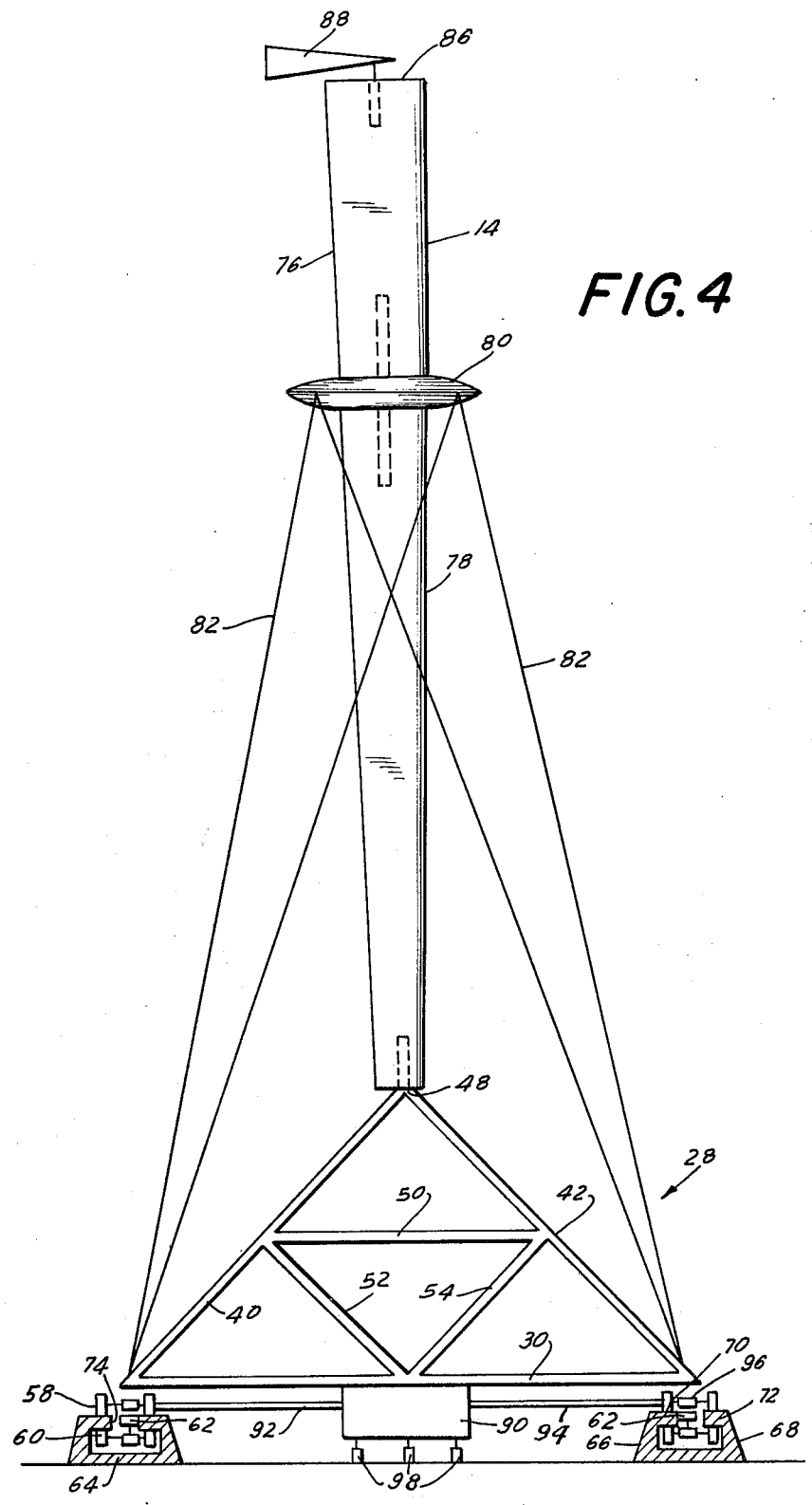
FIG. 4 is an end elevational view of the structure of FIG. 2.

Referring to the drawings, there is shown in FIG. 1 a typical track layout 10 on which are disposed a plurality of wheeled air-foil assemblies 12 each carrying an upright airfoil 14 (FIGS. 2-4). Track layout 10 includes two parallel track segments 16, 18 disposed in an oval configuration having a pair of parallel relatively long straightaways 20, 22 and opposed connecting semi-circular segments 24, 26. For optimum results the long straightaway segments 20, 22 are oriented at right angles to the direction of the prevailing wind at the site of installation.

Referring now more particularly to FIGS. 2-4, each air-foil assembly 12 includes a support structure assembly 28 on which is rotatably supported the upright symmetrical airfoil 14. The support assembly 28 consists of a number of structural steel (or other material) members interconnected for maximum strength to form a tetrahedron. Accordingly, assembly 28 includes four horizontally disposed support members 30, 32, 34 and 36, respectively, which form a square-shaped horizontally oriented base 38. From each corner of base 38 an upwardly and inwardly inclined support member 40, 42, 44 and 46, respectively, are provided with each inclined support member being suitably joined at one end to base 38 and at its other to the other inclined support members, as at 48. Thus each side of the support structure assembly is defined by an inwardly inclined triangular configuration with all four sides forming a four-sided tetrahedron.

Additional cross bracing is provided in each triangularly shaped segment by suitably secured interconnecting crossbrace members 50, 52 and 54, respectively, also disposed, for maximum structural strength, in a triangular configuration.

At each corner of base 38 of support structure assembly 28 is mounted a truck assembly 56 which cooperates with track segments 16 and 18 to counteract downward, lifting and horizontal forces to which the assembly will be subject. Accordingly, each truck assembly 56 includes a set of four upper wheels 58, a set of four lower wheels 60 and a pair of horizontally disposed wheels 62 which cooperate with the track structure, as will be explained more fully hereinbelow, to counteract all the forces acting on the support structure assembly 28.

Each track segment 16, 18 is formed in a configuration which approximates an open trapezoid in cross-section (See FIG. 4) and includes a base segment 64 suitably firmly anchored to the ground and inwardly converging leg segments 66, 68, respectively, extending upwardly from base segment 64 and each terminating at their respective upper ends in a horizontally disposed segment 70, 72, resepectively, to define a space 74 therebetween.

The upper surface of segments 70, 72 form a bearing surface on which upper wheels 58 of each truck assembly 56 roll and the lower surface of segments 70, 72 form a bearing surface for lower wheels 60 of the truck assembly. Horizontal wheels 62 of each truck assembly bear against and roll along the inside end portion of horizontal segments 70, 72, respectively. With this arrangement it is seen that upper wheels 58 support the support structure assembly and counteract the downward forces due to the weight of the structure. Lower wheels 60 counteract any upward lifting forces to maintain the truck assemblies on the tracks and horizontal wheels 62, because of their opposed bearing engagement on the inward side of each track 16 and 18 counteract any horizontal forces tending to tip the structure to insure that the support structure maintains its level orientation on the tracks at all times.

Air-foil 14 is rotatably journaled, in any suitable manner, at the top 48 of support structure assembly 28. Airfoil 14, which may be up to three hundred feet in length, has an air-foil configuration much like the wing of an air craft. The chord width of the air-foil increases from bottom to top, for example from a fifteen foot width to a thirty foot width. This placement of the air-foil maximizes the utilization of the air-foil as wind speed is greater at higher elevations. Airfoil 14 has an upper segment 76 and a lower segment 78. Thus air-foil 14 is discontinuous near its upper end with its upper and an lower segments journaled so as to be freely rotatable about a cross tree bearing 80. A plurality of guy-wires 82 extend from the periphery of cross tree bearing 80 to support assembly 28 to hold and support air-foil 14 in its upright orientation. The diameter of cross tree bearing 80 is selected to be sufficiently large so that air-foil 14 can freely rotate without interfering with any of the guy wires 82.

Each air-foil 14 is also provided with a hinge flap 84 which operates in the same manner as the flaps on aircraft wings to insure that airfoil 14 is properly positioned relative to the wind direction to insure maximum "lift."

Rotatably mounted to the upper end 86 of air-foil 14 is a wind vane 88 which operates in the known manner of wind vanes so as to line up with the direction of the wind. The angular relationship of wind vane 88 and air-foil 14 is controlled by any suitable means such as an electric motor, servo-control system or electro-magnet to rotate air-foil 14 to the desired angle of attack to the wind direction indicated by wind vane 88.

In operation, the prevailing wind when blowing in the direction indicated by the arrow W in FIG. 1 will strike the surface of air-foil 14, as also indicated by arrow W in FIG. 5, causing the air-foil, and hence, support structure 28 to roll forward on the tracks, or to the right as viewed in FIGS. 2 and 5. That forward movement creates wind acting against the air-foil 14 in the direction indicated by the arrow RW in FIG. 5. The vector sum of the winds W and RW acting on air-foil 14 is a resultant apparent wind force acting in the direction indicated by the arrow AW in FIG. 5 which actually drives airfoil 14 in the same manner as the wind passing over an aircraft's wings provides lift to maintain it in flight. Wind vane 88 lines up with the direction of the apparent wind force AW. The net effect is that air-foil 14 and the support structure assembly 28 are driven by the resultant wind along the track in a rightward direction as viewed in FIG. 5.

When a particular support structure assembly 28 is driven the length of the straight segment of track 20, airfoil 14 is feathered and the assembly is powered about semicircular segment 26, as will be explained more fully hereinbelow, until it approaches straight segment of track 22. Airfoil 14 then rotates into the wind at the proper angle of attack as determined by wind vane 88 as set out above and assembly 28 is then driven to the left, as viewed in FIG. 1, along track segment 22.

To extract electrical energy from the system, three-phase electrical generator-motors 90 are provided on each support structure assembly. Each generator-motor 90 has its rotor shaft linked by shafts 92, 94 through differential gear housings 96 at each truck assembly 56 so that rotation of the truck wheels rotates shafts 92, 94 to rotate the rotors of the generator-motors 90.

Each generator-motor 90 has the electrical energy, generated due to the wind's powering of the air-foil and support structure assembly along the track, fed to common busses 98 mounted between the parallel tracks which can be suitably tapped by a power distribution station and distributed.

As noted above, each support structure assembly is powered about semi-circumar track segments 24, 26. That is accomplished by suitable electric controls which automatically change a generator-motor 90 on a support assembly about to navigate the curved track section from a generator stage to a motor stage whereby power is extracted from common busses 98 to operate generator-motor 90 as a motor and drive the wheels through the shafts 92, 94 and differential 96 until the assembly approaches a straight track segment again.

Because each generator-motor 90, in the system where multiple air-foil driven structures are provided, is linked to common busses 98, each generator-motor remains in synchronous operation to drive its respective assembly at the same speed to insure maintenance of uniform spacing between each separate unit. However, since no two assemblies can be exactly the same, due to various factors such as slight differences in wheel size and other variations in tolerances, the spacing between units may change. This change in spacing may be compensated by slipping poles in one unit's generator-motor while it is relatively unloaded just prior to its passing from generator to motor mode or vice-versa.

As noted above, during rare periods when the prevailing wind is of insufficient force to propel the air-foil assemblies about the guide tracks it may be necessary, in order to maintain a continuous power output, to generate electrical power by supplementary means. Aside from using stored energy systems, charged by excess power generation during periods of strong wind conditions, such supplementary power needs may be generated by providing diesel engines on each support assembly structure 28 connected by suitable means to truck assemblies 56 to drive the wheels and propel the assemblies around the guide tracks. During such diesel powered driving of the support structure assemblies the generator-motors 90 would still generate electrical energy.

The free wing turbine of the present invention while described above for use on land using wind power as the motive force is also applicable in water where the power of the ebb and flow of tide races may be used as the motive force. In such applications, the free-wing turbine is mounted inverted in a water tide race on a guide rail system supported on pylons. In such application, because of the greater density of water over air, the air-foil can be significantly shorter in length while still providing a significant ability to be moved about the guide rail system by movement of the water over the foil. In all other respects such a water system would be similar to the air system described above.

It is thus seen that the present invention provides an economical and viable means to harness energy inherent in the wind and the force of the ebb and flow of tide races to generate electrical energy. The initial capital outlay for construction of the electrical energy generation system of the present invention is significantly less than conventional power generation plants and the cost comparison once in operation because the fuel, e.g. wind or water energy, is free becomes much more attractive.

What is claimed is:

1. Apparatus for generating electrical energy from kinetic energy inherent in movement of a fluid comprising:
    guide track means disposed to have a major extent of its length across the path of flow of the direction of prevailing fluid flow,
    at least one support assembly structure disposed for movement along said guide track means,
    an air-foil member rotatably mounted upright on said support assembly structure,
    guy wire means extending from an upper portion of said air-foil member to said support assembly structure to support said air-foil member upright thereon,
    said air-foil structure being adapted to rotate on said support structure to a position with respect to the direction of fluid flow over said air-foil to obtain an optimum angle of attack with respect to the movement of fluid across said air-flow member,
    thereby to move in a direction across the path of fluid movement thereby to move said support assembly structure therewith,
    wheel means associated with said support assembly structure and disposed for rolling movement along said guide track means,
    said guide track means and said wheel means being cooperatively engaged to counteract any forces acting on said air-foil and support assembly structure tending to capsize said air-foil and support assembly structure, and
    electrical energy generator means mounted on said support assembly structure,
    said electrical energy generator means being operatively coupled to said wheel means whereby rotation of said wheel means along said guide track responsive to movement of said support assembly structure along said guide track operates said electrical energy generator means to generate electrical energy.

2. Apparatus as defined in claim 1 wherein a plurality of support assembly structures and air-foil members are provided for movement along said guide track means.

3. Apparatus as defined in claim 1 wherein said guide track means includes a pair of track members disposed parallel to each other and wherein each said track member includes at least three bearing surfaces for engagement with a wheel member.

4. Apparatus as defined in claim 3 wherein each said track member is configured to have a generally trapezoidal configuration in cross-section including a base segment and upwardly and inwardly inclined leg segments extending therefrom, the upper ends of each said inclined leg segments extending horizontally inwardly to an end segment spaced from the end segment of the other horizontal segment, said bearing surfaces being the respective upper and lower surfaces of said horizontally inwardly disposed segments and an end segment of said horizontally inwardly disposed segment.

5. Apparatus as defined in claim 4 wherein said wheel means includes a plurality of wheel members, at least one of said plurality of wheel members being disposed for rolling engagement along each said bearing surface of each said track member.

6. Apparatus as defined in claim 1 wherein said air-foil member is provided with a shape in cross-section having a rounded forward end portion extending smoothly to a thickened mid-portion and tapering to a thinner rear-portion.

7. Apparatus as defined in claim 6 wherein said airfoil member tapers upwardly from a thinner segment immediately adjacent to said support assembly structure to a thicker segment spaced from said support assembly structure.

8. Apparatus as defined in claim 7 wherein said air-foil member is discontinuous nearer the end remote from said support assembly structure, to define an upper and lower segment of said air-foil, a cross tree bearing member disposed between said upper and lower air-foil segments, said air-foil segments being journaled within said cross tree bearing member for relative rotation therewith.

9. Apparatus as defined in claim 8 wherein said guy wire members extend from the peripheral extent of said cross tree bearing member to said support structure assembly.

10. Apparatus as defined in claim 7 including a wind vane member rotatably mounted on the end of said air-foil member remote from said support assembly structure, said wind vane member being adapted to rotate responsive to the direction of sensed fluid flow to indicate the direction of fluid flow.

11. Apparatus as defined in claim 10 including means to rotate said air-foil member to an optimum angle of attack with respect to the sensed direction of fluid flow over said air-flow responsive to the sensed direction of flow as indicated by said wind vane member.

* * * * *